United States Patent
Moore

[15] 3,664,400
[45] May 23, 1972

[54] LOCKING SET SCREW
[72] Inventor: Harrington Moore, Newbury, Mass.
[73] Assignee: George W. Moore, Inc., Waltham, Mass.
[22] Filed: Mar. 2, 1970
[21] Appl. No.: 15,522

[52] U.S. Cl. .................................................151/22, 85/1 SS
[51] Int. Cl. .............................................................F16b 39/30
[58] Field of Search ..................... 151/22, 21 B; 85/1 SS, 46; 10/10, 27

[56] References Cited

UNITED STATES PATENTS

| | | | |
|---|---|---|---|
| 2,135,637 | 11/1938 | Gade | 151/22 |
| 2,371,365 | 3/1945 | Tomalis et al. | 85/46 |
| 2,679,774 | 6/1954 | MacDonald | 151/22 |
| 3,504,722 | 4/1970 | Breed | 151/22 |
| 3,530,920 | 9/1970 | Podell | 151/22 |

FOREIGN PATENTS OR APPLICATIONS

| | | | |
|---|---|---|---|
| 975,103 | 10/1950 | France | 151/22 |

*Primary Examiner*—Marion Parsons, Jr.
*Attorney*—Morse, Altman & Oates

[57] ABSTRACT

A locking set screw is provided by forming a screw with threads of conventional configuration and then rolling two or more of the thread crests on a taper. The taper-rolled threads bite into the threads of a nut or other tapped part to which the screw is threaded and with tapered rolling the locking connection of one thread is in a different plane from the locking connection of the other thread.

3 Claims, 2 Drawing Figures

PATENTED MAY 23 1972          3,664,400

INVENTOR
HARRINGTON MOORE

BY Moore, Altman & Oates

ATTORNEYS

LOCKING SET SCREW

BACKGROUND OF THE INVENTION

1. Field of the Invention

This invention relates generally to set screws and more particularly is directed towards a self-locking set screw of one piece construction.

2. Description of the Prior Art

Set screws are used in a great many different applications such, for example, as securing a knob to a dial shaft, a coupling to a motor shaft or any other similar uses which require locking parts together. Since it is desirable that the set screw remain locked in place over long periods of time, considerable effort has been directed towards developing a simple, low cost locking set screw which will remain in place once it has been set. For example, set screws have been provided with plastic inserts which serve to bind the screw to the tapped wall of the other part and also patches of cement have been coated on the screws for bonding action. Numerous other approaches have been tried in attempts to achieve a simple but effective locking set screw. Prior set screws of the type described above are not entirely satisfactory for the reason that the inclusion of plastic inserts, coating or inclusion of other components add substantially to the cost of the screws by reason of the additional machining and/or assembling operations required. Accordingly, it is an object of the present invention to provide improvements in locking set screws. Another object of the invention is to provide a one-piece, locking set screw requiring no additional parts and which may be set in place by conventional screw driving means without additional locking operations.

SUMMARY OF THE INVENTION

This invention features a locking set screw comprising a screw body formed with a plurality of threads, at least two of which are rolled on a taper so that the rolled thread crests are flattened along a tapered line so as to bite gradually into a cooperating tapped socket for locking engagement therewith.

DETAILED DESCRIPTION OF THE PREFERRED EMBODIMENT

Figure 1:
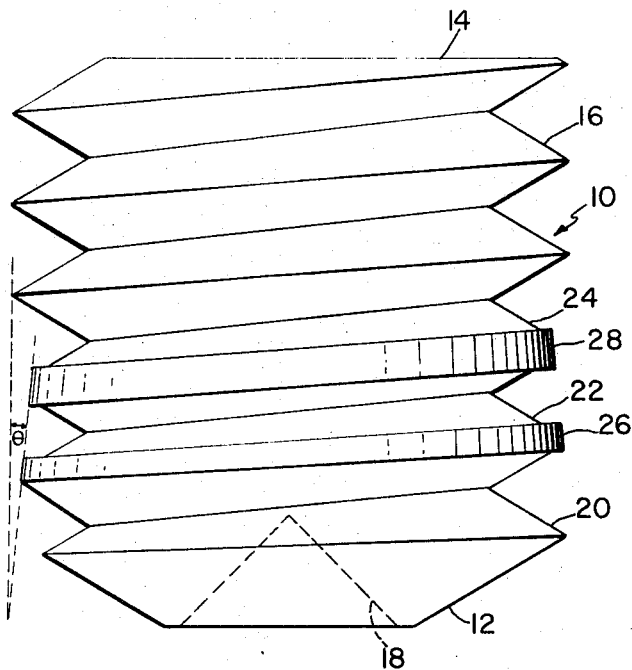
FIG. 1 is a view in front elevation of a locking set screw made according to the invention, and, FIG. 2 is a sectional view in front elevation showing the screw partly broken away and mounted in position.

Referring now to the drawings the reference character 10 generally indicates a locking set screw, made according to the invention, being formed with a point or leading end 12, a head or tracking end 14 and conventional threads 16 extending over a portion of its length. The point 12 typically is formed with a countersinking 18 and the head 14 and may be any one of a conventional driving configuration such as a slotted head, a socket head or a square head, depending upon the particular application involved.

In the preferred form of the invention is a first or leading thread 20 adjacent the point 12 and of conventional configuration whereas the second and third threads 22 and 24 have their crests rolled along a taper pitched towards the head of the screw. The taper rolling of the second and third thread crests form enlarged flattened convolutions 26 and 28, respectively, which subsequently provide locking action with the tapped socket of a part 30 to which the screw is later threaded.

The first of the taper-rolled threads will be seen to have a flat crest somewhat narrower than that of the second thread by reason of the taper rolling. This configuration makes it easier to drive the screw into its mating socket and the locking action will increase gradually as the screw is turned into place. The configuration is such that locking action between the screw and the part takes place in two different planes to enhance the locking action. It will be understood that by locking in two different planes one locking thread will not follow along the same path or groove broached by the leading locking thread as the parts are threaded together as would be the case if both threads were rolled in the same plane.

Figure 2:
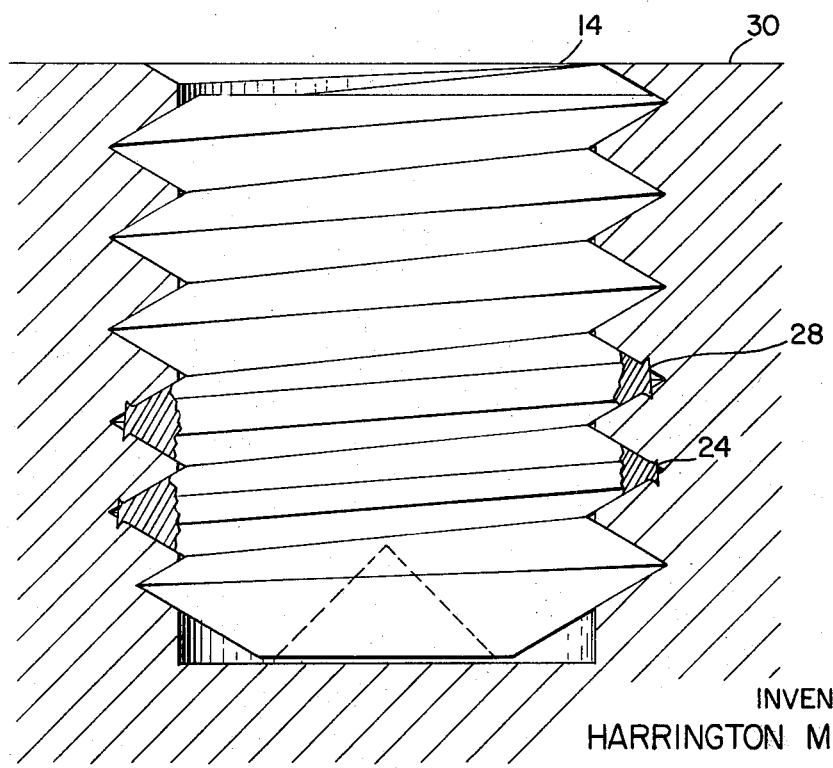

The locking action is more fully demonstrated in FIG. 2 where it will be seen that the flattened portion 26 of the thread 22 has broached into the wall of the cooperating tapped member 30 near the base of its cooperating groove whereas the wider flattened portion 28 of the thread 24 broaches into the tapped wall of member 30 more towards the mid-portion of the adjacent convolution in a plane inward of thread crest 26. If the threads were rolled in the same plane the second thread would follow the track of the first with little additional locking effect between the parts.

In the illustrated embodiment subsequent threads of the screw 10 are of conventional configurations although if desired, the tapered rolling may be extended to other threads. This will, of course, increase the locking action since there would be additional locking convolutions all in different planes if the more threads were taper-rolled.

Having thus described the invention what I claim and desire to obtain by Letters Patent of the United States is:

1. A set screw, comprising
 a. a screw body having a point at one end and a head at the opposite end and formed with a plurality of threads thereon,
 b. at least two of said threads being formed with enlarged flattened crests the outer surfaces of which lie in different tapered planes pitched towards said head,
 c. all of said threads being of a constant thread angle and all of the roots of said threads lying in the same plane.

2. A set screw according to claim 1 wherein at least the leading thread adjacent the tip of said screw is of normal configuration.

3. A set screw, comprising
 a. a screw body formed with a plurality of threads thereon,
 b. at least two of said threads being formed with enlarged flattened crests the outer surfaces of which lie in different tapered planes,
 c. at least the leading thread adjacent the tip of said screw being of normal configuration,
 d. the thread crests after said leading thread being flattened in successively increasing extent.

* * * * *